US007076771B2

(12) United States Patent
Nevill

(10) Patent No.: US 7,076,771 B2
(45) Date of Patent: Jul. 11, 2006

(54) INSTRUCTION INTERPRETATION WITHIN A DATA PROCESSING SYSTEM

(75) Inventor: Edward Colles Nevill, Huntindon (GB)

(73) Assignee: Arm Limited, Cambridge (GB)

( * ) Notice: Subject to any disclaimer, the term of this patent is extended or adjusted under 35 U.S.C. 154(b) by 855 days.

(21) Appl. No.: 09/726,391

(22) Filed: Dec. 1, 2000

(65) Prior Publication Data

US 2002/0103844 A1 Aug. 1, 2002

(51) Int. Cl.
*G06F 9/45* (2006.01)
(52) U.S. Cl. ...................................... 717/139
(58) Field of Classification Search ................ 717/151, 717/159, 148, 139; 768/1
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,587,632 A | 5/1986 | Ditzel | |
| 4,922,414 A | 5/1990 | Holloway et al. | |
| 4,969,091 A | 11/1990 | Muller | |
| 5,136,696 A | 8/1992 | Beckwith et al. | |
| 5,455,775 A | 10/1995 | Huber et al. | |
| 5,619,665 A | 4/1997 | Emma | |
| 5,638,525 A | 6/1997 | Hammond et al. | |
| 5,659,703 A | 8/1997 | Moore et al. | |
| 5,740,461 A | 4/1998 | Jaggar | |
| 5,742,802 A | 4/1998 | Harter et al. | |
| 5,752,035 A | 5/1998 | Trimberger | |
| 5,768,593 A * | 6/1998 | Walters et al. | 717/141 |
| 5,784,584 A | 7/1998 | Moore et al. | |
| 5,809,336 A | 9/1998 | Moore et al. | |
| 5,838,948 A | 11/1998 | Bunza | |
| 5,875,336 A | 2/1999 | Dickol et al. | |
| 5,892,966 A | 4/1999 | Petrick et al. | |
| 5,905,895 A * | 5/1999 | Halter | 717/139 |
| 5,925,123 A | 7/1999 | Tremblay et al. | |
| 5,926,832 A | 7/1999 | Wing et al. | |
| 5,937,193 A | 8/1999 | Evoy | |
| 5,953,741 A | 9/1999 | Evoy et al. | |
| 6,003,126 A | 12/1999 | Huynh et al. | |
| 6,009,499 A | 12/1999 | Koppala | |
| 6,009,509 A | 12/1999 | Leung et al. | |
| 6,014,723 A | 1/2000 | Tremblay et al. | |
| 6,021,469 A | 2/2000 | Tremblay et al. | |
| 6,026,485 A | 2/2000 | O'Connor et al. | |
| 6,031,992 A | 2/2000 | Cmelik et al. | |
| 6,038,643 A | 3/2000 | Tremblay et al. | |
| 6,065,108 A * | 5/2000 | Tremblay et al. | 712/201 |
| 6,070,173 A | 5/2000 | Huber et al. | |

(Continued)

OTHER PUBLICATIONS

Aho, Alfred et al. "Compilers, Principles, Techniques, and Tools" Bell, Telephone Laboratories, Incorporated. 1986. pp. 11 and 19.*

(Continued)

*Primary Examiner*—Lewis A. Bullock, Jr.
(74) *Attorney, Agent, or Firm*—Nixon & Vanderhye P.C.

(57) ABSTRACT

A data processing system having a Harvard type architecture including a separate data store 8 and instruction store 6 is provided with an instruction interpreter 22 that dynamically modifies slow form instructions to fast form instructions. When a slow form instruction is encountered, the instruction interpreter makes a check within the data store whether a fast form of that instruction has already been provided. If a fast form of the instruction is present within the data store, then this is used instead of the slow form.

14 Claims, 2 Drawing Sheets

U.S. PATENT DOCUMENTS

| | | | |
|---|---|---|---|
| 6,088,786 | A | 7/2000 | Feierbach et al. |
| 6,118,940 | A * | 9/2000 | Alexander et al. ......... 717/127 |
| 6,122,638 | A | 9/2000 | Huber et al. |
| 6,125,439 | A | 9/2000 | Tremblay et al. |
| 6,148,391 | A | 11/2000 | Petrick |
| 6,298,434 | B1 | 10/2001 | Lindwer |
| 6,317,872 | B1 | 11/2001 | Gee et al. |
| 6,338,134 | B1 | 1/2002 | Leung et al. |
| 6,349,377 | B1 | 2/2002 | Lindwer |
| 6,374,286 | B1 | 4/2002 | Gee et al. |
| 6,513,156 | B1 * | 1/2003 | Bak et al. ................... 717/151 |
| 6,606,743 | B1 | 8/2003 | Raz et al. |

OTHER PUBLICATIONS

The Java Virtual Machine Specification (Edition 1), Tim Lindholm et al., pp. 389-428.

C. Glossner et al, "Delft-Java Link Translation Buffer", Aug. 1998.

N. Vijaykrishnan et al, "Object-Oriented Architectural Support For a Java Processor" 1998, pp. 330-355.

C. Glossner et al, "The Delft-Java Engine: An Introduction", Aug. 1997.

K. Ebcioglu et al, "A Java ILP Machine Based On Fast Dynamic Compilation", Jan. 1997, pp. 1-13.

A. Wolfe, "First Java-specific chip takes wing" *EETimes*—1997.

Y. Patt, *Introduction to Computer Systems From Bits and Gates to C and Beyond*, 1999, pp. 1-517.

M. Ertl, "Stack Caching for Interpreters" 1994, pp. 1-13.

M. Ertl, "Stack Caching for Interpreters" 1995, pp. 1-13.

M. Ertl, "Implementation of Stack-Based Languages on Register Machines" Apr. 1996, pp. 1-4.

J. O'Connor et al, "PicoJava-1: The Java Virtual Machine in Hardware" *IEEE Micro* A Case for Intelligent RAM, Mar./Apr. 1997, pp. 45-53.

K. Andrews et al, "Migrating a CISC Computer Family Onto RISC Via Object Code Translation" 1992, pp. 213-222.

"PicoJava I Microprocessor Core Architecture" Oct. 1996, pp. 1-8, Sun Microsystems.

M. Ertl, "A New Approach to Forth Native Code Generation" 1992.

M. Maierhofer et al, "Optimizing Stack Code" 1997, p. 19.

D. Ungar et al, "Architecture of SOAR: Smalltalk on a RISC" The 11th Annual International Symposium on Computer Architecture, Jun. 1984, pp. 188-197.

O. Steinbusch, "Designing Hardware to Interpret Virtual Machine Instructions" Feb. 1998, pp. 1-59.

R. Kapoor et al, "Stack Renaming of the Java Virtual Machine" Dec. 1996, pp. 1-17.

A. Yonezawa et al, "Implementing Concurrent Object-Oriented Languages in Multicomputers" *Parallel and Distributed Technology (Systems and Applications)* May 1993, pp. 49-61.

C. Hsieh et al, "Java Bytecode to Native Code Translation; The Caffeine Prototype and Preliminary Results" IEEE/ACM International Symposium on Microarchitecture, Dec. 1996, pp. 90-97.

Y. Patt et al, *Introduction to Computer Systems From Bits and Gates to C and Beyond*, 2001, pp. 1-526.

Sun Microsystems PicoJava Processor Core Data Sheet, Dec. 1997, pp. 1-11.

H. McGhan et al, PicoJava A Direct Execution Engine for Java Bytecode, Oct. 1998, pp. 22-26.

C. Glossner et al, "Parallel Processing" Euro-Par 1997: Passau, Germany, Aug. 1997.

Y. Patt, *Introduction to Computer Systems From Bits and Gates to C and Beyond*, 1999, pp. 10-12 & 79-82.

Espresso—The High Performance Java Core Specification, Oct. 2001, pp. 1-33, Aurora VLSI, Inc.

J. Gosling, "Java Intermediate Bytecodes" 1995, pp. 111-118.

P. Koopman, Jr. "Stack Computers The New Wave" 1989, pp. 1-234.

M. Mrva et al, "A Scalable Architecture for Multi-Threaded JAVA Applications" Design Automation and Test in Europe, Feb. 1998, pp. 868-874.

L. Chang et al, "Stack Operations Folding in Java Processors" *IEEE Proc.—Comput. Digit. Tech.*, vol. 145, No. 5, pp. 333-340 Sep. 1998.

L. Ton et al, Proceedings of the '97 International Conference on Parallel and Distributed Systems, "Instruction Folding in Java Processor", pp. 138-143, Dec. 1997.

K. Buchenrieder et al, "Scalable Processor Architecture for Java With Explicit Thread Support" *Electronics Letters* vol. 33, No. 18, pp. 1532+, Aug. 1997.

C. Chung et al, Proceedings of the '98 International Conference on Parallel and Distributed Systems, "A Dual Threaded Java Processor for Java Multithreading" pp. 693-700, Dec. 1998.

I. Kazi et al, "Techniques for Obtaining High Performance in Java Programs" Sep. 2000, pp. 213-240.

R. Kieburtz, "A RISC Architecture for Symbolic Computation" 1987, pp. 146-155.

M. Berekovic et al, "Hardware Realization of a Java Virtual Machine for High Performance Multimedia Applications" *Signal Processing Systems SIPS 98*, pp. 479-488, 1997.

P. Deutsch, "Efficient Implementation of the Smalltalk-80 System" 1983, pp. 297-302.

"Rockwell Produces Java Chip" Sep. 1997, CNET NEWS. COM.

Y. Patt et al, *Introduction to Computing Systems from Bits and Gates to C and Beyond*, 2001, pp. 1-16, 91-118 & 195-209.

H. Stone, Chapter 12—"A Pipeline Push-Down Stack Computer", 1969, pp. 235-249.

C. Glossner et al, "Delft-Java Link Translation Buffer", Aug. 1998.

N. Vijaykrishnan et al, "Object-Oriented Architectural Support For a Java Processor" 1998, pp. 330-355.

C. Glossner et al, "The Delft-Java Engine: An Introduction", Aug. 1997.

K. Ebcioglu et al, "A Java ILP Machine Based On Fast Dynamic Compilation", Jan. 1997, pp. 1-13.

A. Wolfe, "First Java-specific chip takes wing" *EETimes*—1997.

Y. Patt, *Introduction to Computer Systems From Bits and Gates to C and Beyond*, 1999, pp. 1-517.

M. Ertl, "Stack Caching for Interpreters" 1994, pp. 1-13.

M. Ertl, "Stack Caching for Interpreters" 1995, pp. 1-13.

M. Ertl, "Implementation of Stack-Based Languages on Register Machines" Apr. 1996, pp. 1-4.

J. O'Connor et al, "PicoJava-I: The Java Virtual Machine in Hardware" *IEEE Micro* A Case for Intelligent RAM, Mar./Apr. 1997, pp. 45-53.

K. Andrews et al, "Migrating a CISC Computer Family Onto RISC Via Object Code Translation" 1992, pp. 213-222.

"PicoJava I Microprocessor Core Architecture" Oct. 1996, pp. 1-8, Sun Microsystems.

M. Ertl, "A New Approach to Forth Native Code Generation" 1992.

M. Maierhofer et al, "Optimizing Stack Code" 1997, p. 19.

D. Ungar et al, "Architecture of SOAR: Smalltalk on a RISC" The 11th Annual International Symposium on Computer Architecture, Jun. 1984, pp. 188-197.

O. Steinbusch, "Designing Hardware to Interpret Virtual Machine Instructions" Feb. 1998, pp. 1-59.

R. Kapoor et al, "Stack Renaming of the Java Virtual Machine" Dec. 1996, pp. 1-17.

A. Yonezawa et al, "Implementing Concurrent Object-Oriented Languages in Multicomputers" *Parallel and Distributed Technology* (*Systems and Applications*) May 1993, pp. 49-61.

C. Hsieh et al, "Java Bytecode to Native Code Translation; The Caffeine Prototype and Preliminary Results" IEEE/ACM International Symposium on Microarchitecture, Dec. 1996, pp. 90-97.

Y. Patt et al, *Introduction to Computer Systems From Bits and Gates to C and Beyond*, 2001, pp. 1-526.

Sun Microsystems PicoJava Processor Core Data Sheet, Dec. 1997, pp. 1-11.

H. McGhan et al, PicoJava A Direct Execution Engine for Java Bytecode, Oct. 1998, pp. 22-26.

C. Glossner et al, "Parallel Processing" Euro-Par 1997: Passau, Germany, Aug. 1997.

Y. Patt, *Introduction to Computer Systems From Bits and Gates to C and Beyond*, 1999, pp. 10-12 & 79-82.

Espresso—The High Performance Java Core Specification, Oct. 2001, pp. 1-33, Aurora VLSI, Inc.

J. Gosling, "Java Intermediate Bytecodes" 1995, pp. 111-118.

P. Koopman, Jr. "Stack Computers The New Wave" 1989, pp. 1-234.

M. Mrva et al, "A Scalable Architecture for Multi-Threaded JAVA Applications" Design Automation and Test in Europe, Feb. 1998, pp. 868-874.

L. Chang et al, "Stack Operationgs Folding in Java Processors" *IEEE Proc.—Comput. Digit. Tech.*, vol. 145, No. 5, pp. 333-340 Sep. 1998.

L. Ton et al, Proceedings of the '97 International Conference on Parallel and Distributed Systems, "Instruction Folding in Java Processor", pp. 138-143, Dec. 1997.

\* cited by examiner

```
LDRB     RO, [LR]

CMP      RO, # INVOKE_QUICK

BEQ      DO_INVOKE_QUICK

<RESOLVE>

<REPLACE>

B        PO_INVOKE_QUICK

PO_INVOKE_QUICK
```

INSTRUCTION INTERPRETATION WITHIN A DATA PROCESSING SYSTEM

BACKGROUND OF THE INVENTION

1. Field of the Invention

This invention relates to data processing systems. More particularly, this invention relates to data processing systems that have an instruction interpreter that replaces a slow form instruction with a fast form instruction and that operates using a separate instruction store and data store.

2. Description of the Prior Art

It is known to provide Harvard architecture systems in which a separate data store and instruction store are provided. The separate data store and instruction store may typically be in the form of a separate data cache and instruction cache. Whilst there are advantages associated with such an arrangement, one problem it produces is how to deal with instruction code that is dynamically altered at runtime. In particular, it is known to provide an instruction interpreter that will modify a slow form of instruction to a fast form of instruction at runtime. In a Harvard system, the instructions are typically provided within a read only store and the writing of a modified form of instruction out to the data store would entail a performance reducing flush and reload of at least some portions of the data and instruction stores or risk problems due to inconsistency between different forms of the same instruction being held in the instruction store and the data store.

SUMMARY OF THE INVENTION

Viewed from one aspect the present invention provides apparatus for processing data, said apparatus comprising:

(i) a processor core;

(ii) a main memory operable to store instruction words and data words;

(iii) a data store operable to store words from said main memory accessed by a data store port of said processor core;

(iv) an instruction store operable to store words from said main memory accessed by an instruction store port of said processor core; and (v) an instruction interpreter operable to read instruction words from said instruction store; wherein (vi) said instruction interpreter is operable to modify a slow form instruction within said instruction store to a fast form instruction of one or more possible fast form instructions and to write said fast form instruction to said data store, said slow form instruction and said fast form instruction having a common functionality when executed by said interpreter; and (vii) said instruction interpreter is operable upon reading a slow form instruction from said instruction store to check for a corresponding fast form instruction within said data store and, if said fast form instruction is present within said data store, then to execute said fast form instruction instead of said slow form instruction.

The invention recognises the above problems and provides the solution of using the instruction interpreter to check, upon encountering a slow form instruction whether or not a corresponding fast form instruction exists within the data store and, if present, to replace the slow form instruction with that fast form instruction. It has been found that the additional processing overhead associated with this check within the data store for a fast form of instruction is more than compensated for by the ability reliably to replace slow form instructions with fast form instructions with systems having a separate data store and instruction store.

It will be appreciated that the instruction interpreter could take many different forms. In particular, the instruction interpreter could be a hardware based instruction translator, a software based interpreter or a hybrid of the two.

It will be appreciated that whilst the separate data store and instruction store could take various different forms, the invention is particularly useful in embodiments having separate data caches and instructions caches.

The invention is particularly useful in embodiments in which an unresolved memory access is dynamically replaced by a resolved memory access. The unresolved memory access typically involves a symbolic reference to the data or instructions being sought whereas the resolved memory access will typically include a numeric reference to this information, the numeric reference being capable of direct use to return the required information and greatly increase speed.

The ability to properly replace stow form instructions with fast form instructions is particularly useful in embodiments in which the slow form instructions invoke additional processing procedures before completion, such as calls to further processing resources, which may even be on remote systems.

The ability to properly replace slow form instructions with fast form instructions is particularly useful when interpreting Java Virtual Machine instructions.

The instruction interpreter may in certain high performance embodiments of the invention where the advantage of properly replacing slow form with fast form instructions is particularly useful comprise an instruction translator for translating Java Virtual Machine instructions into native instructions of the processor core.

Viewed from another aspect the present invention provides a method of processing data using an apparatus having a processor core, a main memory operable to store instruction words and data words, a data store operable to store words from said main memory accessed by a data store port of said processor core, an instruction store operable to store words from said main memory accessed by an instruction store port of said processor core, and an instruction interpreter operable to read instruction words from said instruction store; said method comprising the steps of:

(i) modifying a slow form instruction within said instruction store to a fast form instruction of one or more possible fast form instructions and to write said fast form instruction to said data store, said slow form instruction and said fast form instruction having a common functionality when executed by said interpreter; and (ii) upon reading a slow form instruction from said instruction store, checking for a corresponding fast form instruction within said data store and, if said fast form instruction is present within said data store, then executing said fast form instruction instead of said slow form instruction.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
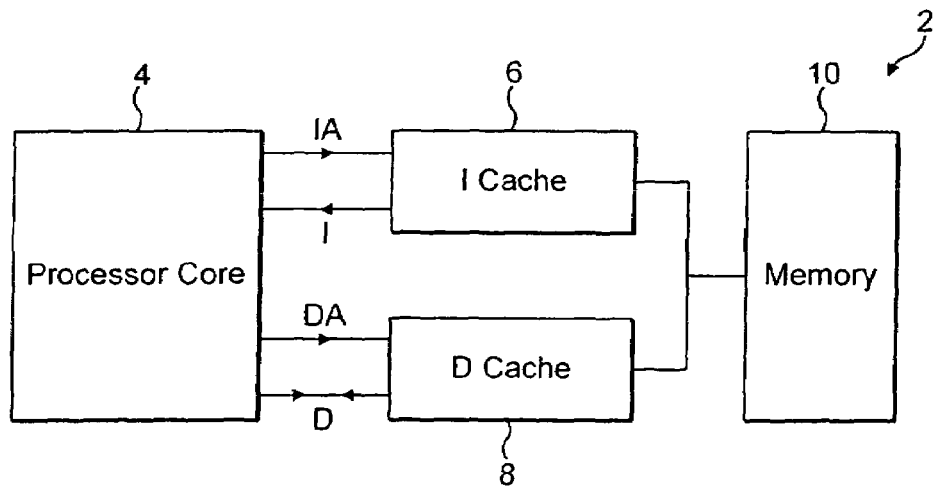
FIG. 1 schematically illustrates a Harvard type system within which the present invention may be utilised.

FIG. 1 illustrates a data processing system 2 including a processor core 4, an instruction cache 6, a data cache 8 and a main memory 10. The processor core 4 has an instruction access port that allows read only access to instructions within the instruction cache 6. Conversely, a data access port is provided that allows both read and write access to data words within the data cache 8. A unified external memory 10 is provided beyond the instruction cache 6 and the data cache 8.

In operation, instructions to be executed are read from the main memory 10 into the instruction cache 6 and then from the instruction cache 6 into the processor core 4 where they are executed. Data words required for the data processing operation specified by the instructions or generated by those instructions are read from or written to the data cache 8.

Figure 2:
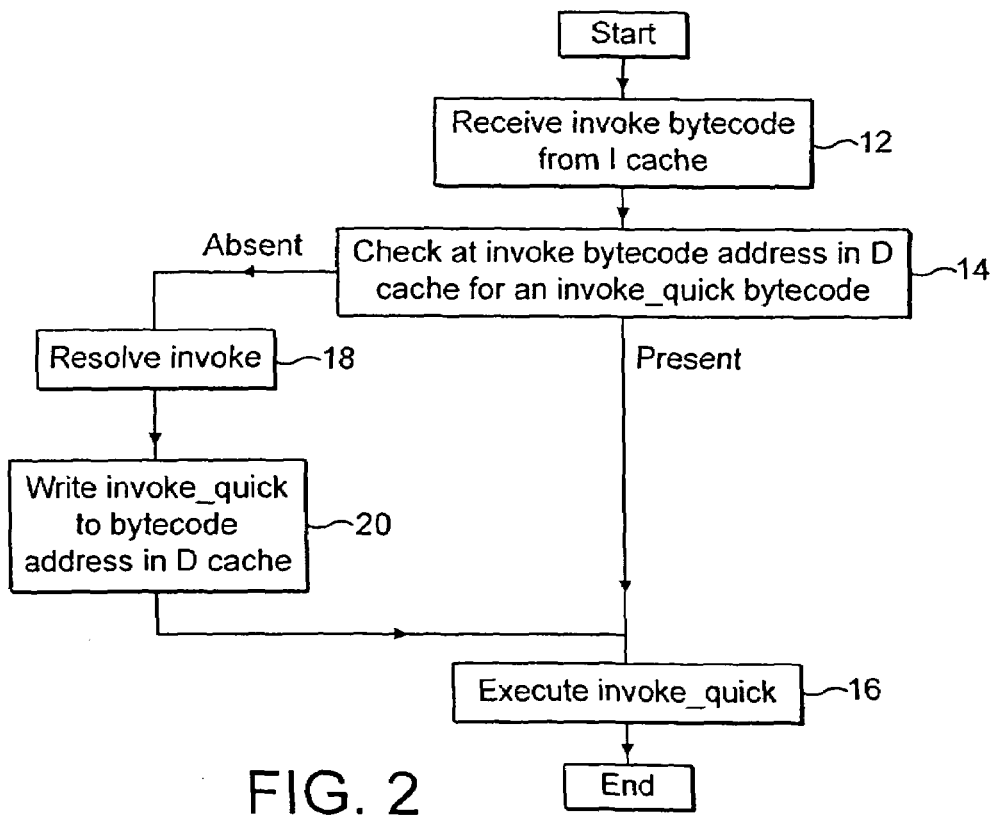
FIG. 2 is a flow diagram illustrating the processing operations conducted in dealing with one type of slow form instruction.

FIG. 2 is a flow diagram illustrating the processing that may take place in the interpretation of a particular example slow form instruction. At step 12 an "invoke" Java bytecode instruction is read from the instruction cache 6. This "invoke" instruction is a slow form instruction that includes a symbolic reference to the process being invoked. It is known to provide interpreters that dynamically replace slow form instructions such as "invoke" with fast form instructions such as "invoke_quick". The fast form instruction "invoke_quick" includes a numeric reference to the processing code being called.

At step 14, the system makes a check at the instruction address of the "invoke" bytecode within the data cache 8 to see if an "invoke_quick" bytecode is already stored within the data cache 8 at that address indicating that the slow form instruction has already been encountered and resolved into a fast form instruction in previous processing. If such a fast form instruction is present, then processing proceeds to step 16 at which the fast form "invoke_quick" instruction is executed instead of the slow form "invoke" instruction. If the fast form instruction is not present within the data cache 8, then processing proceeds to step 18 at which the slow form instruction is resolved into a fast form instruction. Step 20 writes the fast form instruction "invoke_quick" into the data cache 8 at the instruction address for the slow form instruction and then processing proceeds to step 16 at which the resolve fast form instruction "invoke_quick" is executed.

It will be appreciated that the above example is given in relation to one specific slow form instruction, namely "invoke". It will be appreciated that analogous processing operations may also be performed in respect of other slow form Java bytecode instructions such as:

anewarray;
checkcast;
getfield;
getstatic;
instanceof;
invoeinterface;
invokespecial;
invokestatic;
invokevirtual;
ldc;
ldc_w;
ldc2_w;
multainewarray;
new;
putfield; and
putstatic.

In each of these cases the respective fast form instructions to which the slow form instructions are resolved is given by:

anewarray_quick;
checkcast_quick;
getfield_quick;
getfield_quick_w;
getfield2_quick;
getstatic_quick;
getstatic2_quick;
instanceof_quick;
invokeinterface_quick;
invokenovirtual_quick;
invokesuper_quick;
invokestatic_quick;
invokevirtual_quick_w;
invokevirtualobject_quick;
ldc_quick;
ldc_w_quick;
ldc2_w_quick;
multianewarray_quick;
new_quick;
putfield_quick;
putfield2_quick;
putstactic_quick; and
putstatic2_quick;.

It will be noted that there are more quick forms than slow forms. This is because a single slow form may map to different quick forms depending on the operands of the slow form, the size of operands being manipulated, the size of the operand index and other factors.

For example the slow operand getfield may map to one of getfield_quick getfield_quick_w or getfield2_quick as follows.

getfield ->getfield_quick

The opcode of this instruction was originall getfield, operating on a field determined dynamically to have an offset into the class instance data of 255 words or less and to have a width of one word.

getfield ->getfield_quick_w

The opcode of this instruction was originally getfield, operating on a field determined dynamically to have an offset into the class instance data of more than 255 words.

getfield ->getfield2$_{quick}$

The opcode of this instruction was originally getfield, operating on a field determined dynamically to have an offset into the class instance data of 255 words or less and to have a width of two words.

Here is a complete list of the mappings between slow and quick opcodes.

anewarray->anewarray
checkcast->checkcast_quick
getfield->getfield_quick
getfield->getfield_quick_w
getfield->getfield2_quick
getstatic->getstatic_quick
getstatic->getstatic2_quick
instanceof->instanceof_quick
invokeinterface->invokeinterface_quick
invokespecial->invokenonvirtual_quick
invokespecial->invokesuper_quick invokespecial->invokestatic_quick
invokevirtual->invokevirtual_quick
invokevirtual->invokevirtual_quick_w
invokevirtual->invokevirtualobject_quick
ldc->ldc_quick
ldc_w->ldc_w_quick
ldc2_w->ldc2_w_quick
multianewarray->multianewarray_quick
new->new_quick
putfield->putfield_quick
putfield->putfield_quick_w
putfield->putfield2_quick
putstatic->putstatic_quick
putstatic->putstatic2_quick A detailed description of this may be found in "The Java Virtual Machine Specification" (Edition 1 ) by Tim Lindholm and Frank Yellin published by Addison Wesley, ISBN 0-201-63452 -X. Note that this information has been removed from Edition 2.

Figures 3, 4:
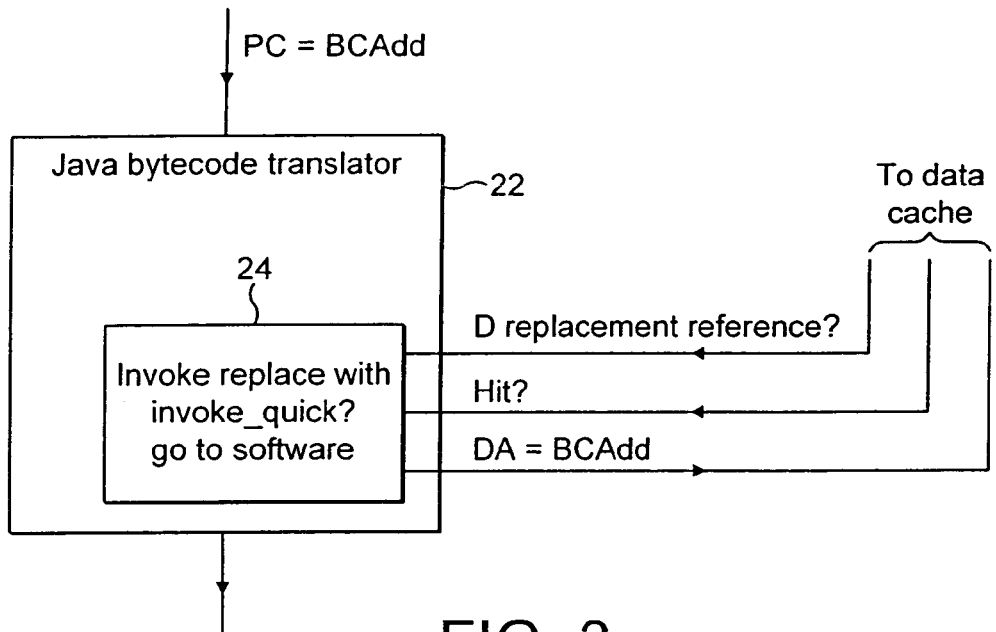
FIG. 3 illustrates a Java bytecode translator that may implement the invention.
FIG. 4 illustrates some ARIM native instructions that may be used by a sofware interpreter to implement the invention.

FIG. 3 illustrates a hardware based instruction translator that may provide one embodiment of the invention. The hardware based instruction translator 22 includes hardware logic that recognises a particular slow form bytecode received. The instruction translator 22 may be present within the instruction processing pipeline of a processing system and accordingly will have access to the program counter address that is the bytecode address for the Java bytecode currently being translated. The bytecode address is represented as "BCAdd". Specific hardware 24 within the instruction translator 22 issues a lookup to the data cache 8 at the bytecode address BCAdd. If a Hit signal is returned, then this is accompanied by the replacement fast form instruction including its numeric reference and then this fast form instruction is used in place of the slow form instruction. In many cases, the fast form instruction is then passed form the instruction translator 22 to a complementary software interpreter as both the slow form instruction and the fast form instruction are too complex to be directly translated by the hardware translator 22. However, some fast form instructions are simple enough to be executed directly by the hardware translator 22, e.g. getfield_quick can be executed by hardware whereas the slow form is executed by software. Even though both of the slow form instruction and the fast form instruction are to be passed out to the software interpreter, the software interpreter is able to deal with the fast form instruction much more quickly than the slow form instruction since it already includes a resolved numeric address reference.

FIG. 4 illustrates an example of some ARM processor instructions that may be used within a software interpreter to check whether or not a fast form instruction of an encountered slow form instruction is already present within the data cache 8. The first instruction loads into register R0 the contents of the data cache 8 corresponding to the bytecode address of the slow form instruction encountered. The second instruction compares the returned contents of the bytecode address from the data cache 8 with the bytecode for the fast form of the instruction. The third instruction branches to a routine that executes the returned fast form instruction if that has been found. If the branch is not taken, then the processing proceeds to resolve the slow form of the instruction into the fast form of the instruction after which the fast form of the instruction is executed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
    (i) a processor core;
    (ii) a main memory operable to store instruction words and data words;
    (iii) a data store operable to store words from said main memory accessed by a data store port of said processor core;
    (iv) an instruction store operable to store words from said main memory accessed by an instruction store port of said processor core; and
    (v) an instruction interpreter operable to read instruction words from said instruction store; wherein
    (vi) said instruction interpreter is operable to modify a slow form instruction within said instruction store to a fast form instruction of one or more possible fast form instructions and to write said fast form instruction to said data store, said slow form instruction and said fast form instruction having a common functionality when executed by said interpreter; and
    (vii) said instruction interpreter is operable upon reading a slow form instruction from said instruction store to check for a corresponding fast form instruction within said data store and, if said fast form instruction is present within said data store, then to execute said fast form instruction instead of said slow form instruction.

2. Apparatus as claimed in claim 1, wherein said instruction interpreter is a hardware based instruction translator.

3. Apparatus as claimed in claim 1, wherein said instruction interpreter is a software based interpreter.

4. Apparatus as claimed in claim 1, wherein said instruction interpreter is a combination of a hardware based instruction translator and a software based interpreter.

5. Apparatus as claimed in claim 1, wherein said data store is a data cache and said data store port is a data cache port.

6. Apparatus as claimed in claim 1, wherein said instruction store is an instruction cache and said instruction store port is an instruction cache port.

7. Apparatus as claimed in claim 1, wherein said slow form instruction results in an unresolved storage access request to one or more stored words and said fast form instruction results in a resolved storage access request to said one or more stored words.

8. Apparatus as claimed in claim 1, wherein said slow form instruction includes a symbolic reference to a required element and said fast form instruction includes a numeric reference to said required element.

9. Apparatus as claimed in claim 1, wherein said slow form instruction invokes an additional data processing procedure before completion.

10. Apparatus as claimed in claim 1, wherein said slow form instruction and said fast form instruction are Java Virtual Machine instructions.

11. Apparatus as claimed in claim 10, wherein said slow form instruction is one of:
    anewarray;
    checkcast;
    getfield;
    getstatic;
    instanceof;
    invokeinterface;
    invokespecial;
    invokestatic;

invokevirtual;
ldc;
ldc_w;
ldc2_w;
multainewarray;
new;
multianewarray;
new;
putfield; and
putstatic.

12. Apparatus as claimed in claim 10, wherein said fast form instruction is one of:
anewarray_quick;
checkcast_quick;
getfield_quick;
getfield_quick_w;
getfield2_quick;
getstatic_quick;
getstatic2_quick;
instanceof_quick;
invokeinterface_quick;
invokenonvirtual_quick;
invokevirtual_quick;_w;
invokevirtualobject_quick;
ldc_quick;
ldc_w_quick;
ldc2_w_quick;
multianewarray_quick;
new_quick;
putfield_quick;
putfield_quick;_w;
putfield2_quick;
putstatic_quick; and
putstatic2_quick.

13. Apparatus as claimed in claim 10, wherein said instruction interpreter translates Java Virtual Machine instructions to native instructions of said processor core.

14. A method of processing data using an apparatus having a processor core, a main memory operable to store instruction words and data words, a data store operable to store words from said main memory accessed by a data store port of said processor core, an instruction store operable to store words from said main memory accessed by an instruction store port of said processor core, and an instruction interpreter operable to read instruction words from said instruction store; said method comprising the steps of:

(i) modifying a slow form instruction within said instruction store to a fast form instruction of one or more possible fast form instructions and to write said fast form instruction to said data store, said slow form instruction and said fast form instruction having a common functionality when executed by said interpreter; and (ii) upon reading a slow form instruction from said instruction store, checking for a corresponding fast form instruction within said data store and, if said fast form instruction is present within said data store, then executing said fast form instruction instead of said slow form instruction.

* * * * *